June 16, 1959 T. A. SMITH 2,891,230
QUICK DISCONNECT DEVICE FOR DIAL ILLUMINATOR
Filed Feb. 16, 1955 2 Sheets-Sheet 1

INVENTOR
THOMAS A. SMITH
BY Wilson R. Maltby
Louis B. Applebaum
ATTORNEYS

June 16, 1959

T. A. SMITH 2,891,230

QUICK DISCONNECT DEVICE FOR DIAL ILLUMINATOR

Filed Feb. 16, 1955

INVENTOR
THOMAS A. SMITH

BY Wilson R. Maltby
Louis B. Applebaum
ATTORNEYS

United States Patent Office 2,891,230
Patented June 16, 1959

2,891,230
QUICK DISCONNECT DEVICE FOR DIAL ILLUMINATOR

Thomas A. Smith, Wilmington, Del., assignor, by mesne assignments, to the United States of America as represented by the Secretary of the Navy Application February 16, 1955, Serial No. 488,732

1 Claim. (Cl. 339—17)

The present invention relates, in general, to indicating instruments, and more specifically to a plug and brush contact device to form an easily detachable electrical connection between the body and an electrically conducting transparent glass face of an instrument.

In the operation of moving vehicles, it is important that the operator be apprised of discrete information by means of specific instruments. In an aircraft, for example, for safe flying procedures it is important that the pilot be continuously aware of the basic mechanical and aero dynamic conditions of the aircraft by means of instruments that must be read under varying light conditions from the extremes of direct sunlight to darkness.

Thus the level of light intensity of the dial must be variable in accordance with the surrounding levels of light intensity, and said dial must also be uniformly illuminated to prevent fatigue-causing bright and dark areas.

The uniform lighting requirements of the instrument dial are satisfied by the utilization of a small lamp or bulb that is centrally mounted on the glass face. A voltage is applied across the lamp terminals by means of two conducting wires that are securely attached to or imbedded in the transparent glass face; or by coating the surfaces of the face with a transparent electrically conductive coating. The wires or conductive coating, aside from supplying current to the lamp, serve an additional purpose of heating the transparent face, by reason of the internal resistance of the conductive means, to prevent fogging of the instrument face.

Presently, the electrical connections between the instrument case and face is by means of two conductive wires that are connected to the case and soldered to the glass face. The soldering of the wires to the face is a very difficult and expensive operation because the heat involved in the joining process tend to crack the tempered glass face. The permanently attached wire connections inhibit the repair and servicing of the instrument because of the movement restrictions that are imposed upon the face.

To solve such problems, this device allows current to flow from the case or body contacts to the face conductor by means of plug and brush contacts that are easily connected and disconnected, thus allowing complete and rapid removal of the transparent face from the instrument body. This is accomplished by providing an electrically conducting socket, and brush combination that couples electrical contacts on the face and body of an instrument to make an electrical contact between the contacts on said face and body.

One object of this invention is to provide a detachable non-arcing electrical coupling between the body and the face of an instrument; and An additional object is to provide a device that electrically couples together the body and face of an instrument in a manner that will not restrict the removal of the body from the face.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
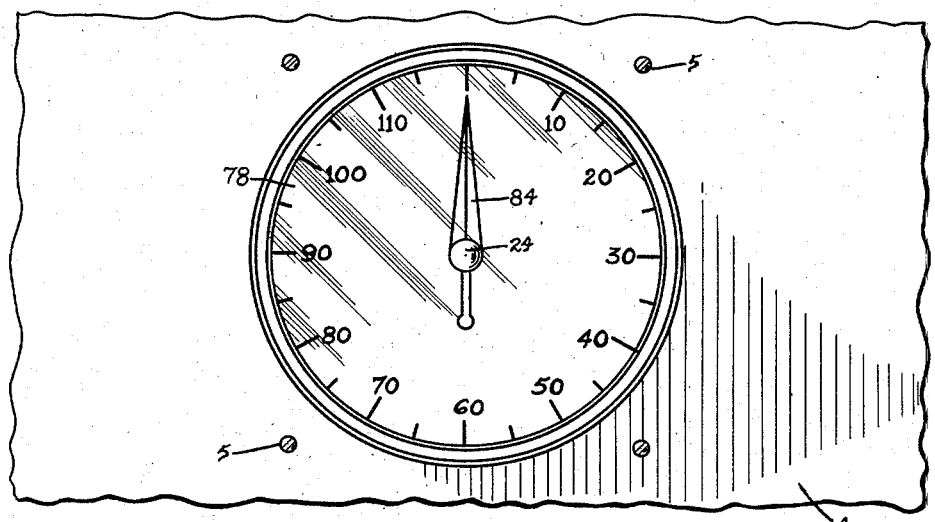
Fig. 1 is a front view of an indicating instrument such as an oil pressure, speed or temperature instrument that is mounted on an instrument panel, showing a preferred embodiment of the invention.

The indicating instrument comprises a body or casing 2 that is adapted for mounting on an instrument panel 4 by means of screws or bolts 5. The dial 78 contains discrete information in the form of lines and numbers that are indicated by the position of the pointer 84. (In Fig. 1, the pointer is shown at rest on the zero position.) Located directly over the pivot axis of the pointer 84 is a lamp and housing 24 that provides illumination for the dial 78.

Figure 2:
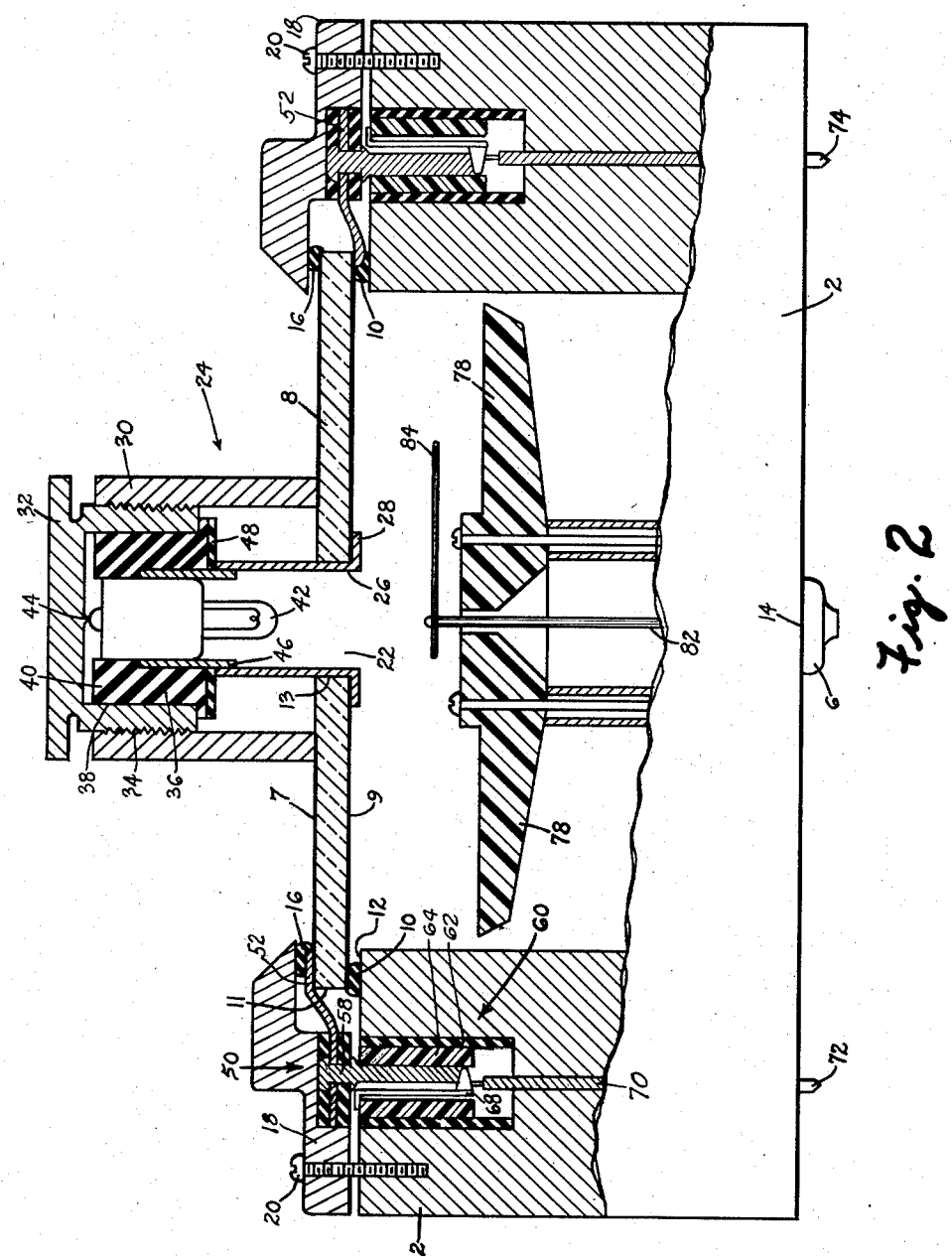
Fig. 2 is a vertical cross section, with portions broken away and parts shown in elevation, of the instrument illustrated in Fig. 1.

All instruments that are utilized within an airplane must have anti-fogging means, and many such instruments require an hermetically-sealed casing for accurate operation. The hermetical sealing of an instrument may be accomplished in the manner indicated in Fig. 2. The body or casing 2 is cup-shaped and contains an airtight electrical coupling 6 at some convenient location 14 which connects to a pointer rotating mechanism. The sealing is completed by means of a transparent glass or plastic front 8 that sits on a ring gasket 10 that may be made of rubber. Said gasket 10 is in contact with the lip or ledge 12 of the body 2. A second ring gasket 16, that may also be composed of rubber, is located immediately above said gasket 10 and in close contact with the upper surface of the glass 8. A ring 18 is secured to the body 2 by bolts 20. Said bolts 20 draw the ring 18 down, thus compressing the gasket 10 tightly between the glass face 8 and the ledge 12 to form an airtight joint.

The face plate 8 is coated with a transparent electrical conducting coating on each surface 7 and 9. This coating enables current to flow across the surface of the face plate 8. The coating is only on the surfaces 7 and 9 and not on the edges 11 and 13 of said face plate 8. Thus, there is no direct electrical path between said surfaces 7 and 9, as said face plate 8 is composed of a transparent insulator such as glass or plastic. A hole 22 in the center of the face 8 accommodates a lamp and housing 24. A cylindrical electrical contact 26 having a flanged end 28 is mechanically connected as by solder to the face 8, and electrically connected to the conducting coating that is on the surface 9. This connection results in an airtight joint. A second cylindrical contact 30 is mechanically connected to said face 8 and electrically connected to the conducting coating on the surface 7 in a manner that is similar to the coupling between said contact 26 and said face 9. The contact 30 is provided with internal screw threads. Thus, there is no direct electrical connection between the two contacts 30 and 26. A hollow electrical conducting cap 32 has external screw threads 34 that engage with the internal threads of the contact 30. An insulating sleeve 36, of hard rubber or Bakelite, is cemented to the interior wall 38 of the cap 32. Said sleeve 36 contains an inwardly positioned lateral projection 40. A conventional lamp 42 is positioned between said projections 40 and is retained in place by well known means to make one electrical contact with said cap 32 at the point 44. An electrical conducting bulb-contact cylinder 46 is cemented to the interior wall of the insulating sleeve 36 and butts against the abrupt projection 40 of said sleeve 36. Said sleeve 46 makes the second electrical contact with the bulb 42. A rubber gasket 48 is provided at the lip of the cap 32 to seat on the end of the cylindrical contact 26 to complete the hermetical sealing of the unit.

Figure 4:
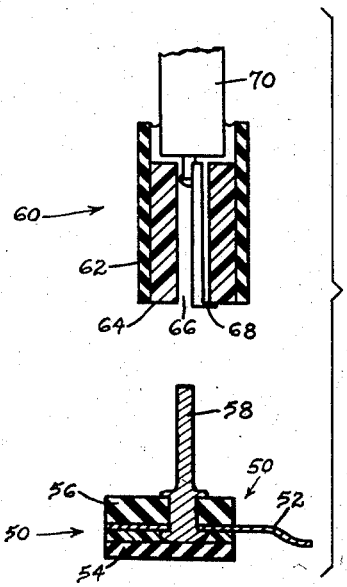
Fig. 4 is a cross sectional view of the plug assembly for the feeding of current to the lamp assembly.

Current is brought to the lamp 42 by means of brushes 52 that are located within the ring 18 and contact the conductive coatings on each surface 7 and 9 of said face 8. The brushes receive current from female connector plugs 60 located within the body 2 of the unit. Securely attached to the ring 18 is the male plug assembly 50. Said assembly comprises an electrical conducting brush or strip of spring-tempered metal 52 to function as a brush contact. It was found that when said brush 52 was made of beryllium copper it functioned in an acceptable manner. As shown in Fig. 4, one end of said brush 52 is imbedded in the insulator 56. Insulator plate 54 is attached to ring 18. An electrical conducting prong 58 of brass or beryllium copper is rigidly connected to the insulating plate 56 and is electrically connected to the brush 52. The prong 58 and brush 52 are electrically insulated from the ring 18. Said prong functions as a male connector and is slidably connected to a female plug 60 located in a cut-out portion of the body 2 and retained in position by any standard means such as cementing. The female plug assembly 60 comprises a plastic sleeve 62 that is accommodated by a circular recess in the body 2. A plastic cylindrical insert 64 is securely cemented to the plastic sleeve 62 and contains a centrally located longitudinally running hole 66 to accommodate the male prong 58. An electrical conducting contact bar 68 is cemented to the interior wall of the circular hole 66. An insulated electrical conducting wire 70 is connected to the contact bar 68 at one end and to an input connector 72 at the other end. Said connector 72 is electrically insulated from and securely attached to the body 2. The brush 52 is positioned in a manner that will not disturb the hermetical sealing around the face 8. The brush 52 makes electrical contact by pressure with the conductive coating on the surface 7 of the face 8. In a similar manner, an electrical connection is made with the conductive coating on the surface 9 of the face 8. An input connector 74 is electrically coupled to the second mentioned brush assembly. In practice the ring 18, lamp assembly 24, and face 8 may be removed by lifting up ring 18, after removing the bolts 20. It is thus noted that there is no rigid electrical connection between the body 2, the ring 18, the face 8 and lamp assembly 24. Therefore, it is possible to rapidly remove or replace the face 8 and the lamp 42 to replace faulty parts or to adjust the instrument movement within the body 2.

In operation of the lamp, a voltage is applied across the terminals 72 and 74. For convenience it shall be assumed that the flow of current is from the terminal 72 to the terminal 74. The flow of current is from the terminal 72, through the wire 70, to the contact bar 68. The prong 58 picks up the current and feeds it to the conductive coating on the surface 7, through the brush 52. The cylindrical contact 30 picks up said current and feeds it to the lamp 42 through the cap 32. The return path for the current is from the lamp 42, to the terminal 74 through the sleeve 46 to the cylindrical contact 26, to the conductive coating on the lower surface 9, to the second male plug assembly, to the second female plug and through to the terminal 74.

The electrical conductive coating on the two surfaces of the face 8 has a measurable interval resistance. As a result of this resistance, heat will be generated, and the face 8 will become warmed by the current that flows to the lamp 42, thus providing the heated face essential to prevent fogging. This current is utilized to light the bulb 42. Thus the instrument face contains anti-fogging means and illumination means, and is coupled to the instrument body through a non-rigid, non-restrictive quick-disconnect electrical coupling.

Figure 3:
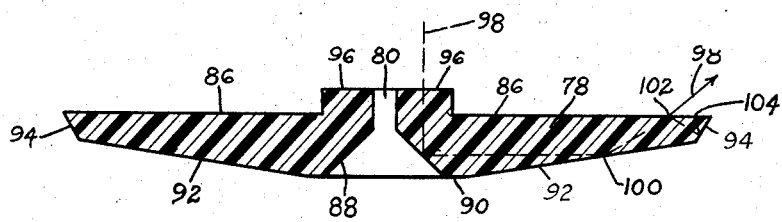
Fig. 3 is a cross section view of the dial.

Centrally positioned immediately below said lamp 42 is a dial 78 that is composed of clear plastic or glass. Said dial is positioned relative to a standard meter movement (not shown) by standard means such as screws and studs. The center of said dial 78 contains a small hole 80 that accommodates the instrument dial hand shaft 82. The movement of said shaft 82 is controlled by the instrument movement located within the body 2. A pointer or hand 84 is connected to said shaft 82 to indicate the angular movement of the shaft 82 relative to the dial 78. The dial has a flat top surface 86 on which there is engraved indicia that represent discrete information. The lower portion of said hole 80 is cut out and polished to form a conical prism 88. The back side of the dial plate 78 tapers from a relatively thick section 90. The back side of said dial is divided into approximately three equal parts, the center one third 90, and the end thirds 92. The end thirds 92 taper from the thick center section 90 to a thinner edge 94. Said edge 94 is on a greatly increased angle. In the operation of the dial plate 78, light from the bulb 42 enters the dial at the top polished surface 96, as illustrated by the single ray of light 98 in Fig. 3. The conical prism 88 redirects the ray of light into the dial 78. At some point 100 the ray of light contacts the highly polished tapered section 92 and is redirected upward towards the top surface 86. At the location 102, the ray of light contacts the upper surface 86 that contains the indicia. At this location a portion of the ray 98 passes through the dial to illuminate the indicia, and the remainder is redirected to the edge 94 where is it redirected through the upper surface 86 at the location 104 to generate additional illumination on the indicia.

Thus it can be seen that this dial redirects a major portion of the light that enters the dial 78 to the indicia markings that are located near the edge of the dial in an abundance of high level uniform illumination.

Obviously many modifications and variations of the present invention are possible in the light of the above teachings. It is therefore to be understood that within the scope of the appended claim the invention may be practiced otherwise than as specifically described.

I claim:

The combination of a current-conducting coating on a glass body and quick disconnect means comprising a ring with an extension overlying said coating, a recess in said ring, a male plug assembly retained in said recess, a resilient brush contact seated in said plug assembly and engaging said coating, a prong member extending from said plug assembly, a casing closely spaced from said coated glass body, a female plug assembly having a bore receiving said prong member, seated in said casing, current conducting means secured to said female plug assembly whereby current is conducted to said coating and means to secure said coated glass body, ring and casing together by pressure only.

References Cited in the file of this patent

UNITED STATES PATENTS

| | | |
|---|---|---|
| 1,291,443 | Dorsey | Jan. 14, 1919 |
| 2,175,768 | Anthony | Oct. 10, 1939 |
| 2,188,530 | Del Camp | June 30, 1940 |
| 2,444,046 | Jacobs | June 29, 1948 |
| 2,486,285 | Hurst | Oct. 25, 1949 |
| 2,702,340 | Thieblot | Feb. 14, 1955 |

FOREIGN PATENTS

| | | |
|---|---|---|
| 580,216 | Great Britain | Aug. 30, 1946 |